United States Patent [19]

Sanner et al.

[11] 4,251,800
[45] Feb. 17, 1981

[54] TILT COMPENSATING AGC

[75] Inventors: Medford D. Sanner, Irving; Ellis K. Cave, Garland, both of Tex.

[73] Assignee: Recognition Equipment Incorporated, Dallas, Tex.

[21] Appl. No.: 29,496

[22] Filed: Apr. 12, 1979

[51] Int. Cl.³ .............................................. G06K 9/22
[52] U.S. Cl. ........................... 340/146.3 SY; 235/472
[58] Field of Search .............. 235/472; 340/146.3 SY, 340/146.3 AG, 146.3 H; 250/557, 561, 568, 567, 214 AG

[56] References Cited

U.S. PATENT DOCUMENTS

| 3,553,437 | 1/1971 | Boothroyd | 340/146.3 H |
|---|---|---|---|
| 3,832,686 | 8/1974 | Bilgutay | 235/472 |
| 3,872,434 | 3/1975 | Duvall et al. | 340/146.3 AG |
| 3,885,229 | 5/1975 | Negita et al. | 340/146.3 H |
| 3,963,901 | 6/1976 | Gevas | 235/472 |
| 4,180,800 | 12/1979 | Isshiki et al. | 340/146.3 SY |

Primary Examiner—Leo H. Boudreau
Attorney, Agent, or Firm—John E. Vandigriff

[57] ABSTRACT

A correcting bias is applied to the video signal from a hand-held optical character reader to compensate for horizontal tilt of the hand-held reader and also to increase the acceptability of photodiode arrays which are used in the reader and to correct uneven sensitivity of the photoelements in the photodiode arrays. The analog video is changed to a four bit video and this four bit video is processed to produce a tilt error signal indicative of magnitude and direction of the tilt. This tilt error signal is then applied back as a compensating factor in the four bit analog to digital converter to compensate for the tilt of the hand-held reader.

6 Claims, 7 Drawing Figures

TILT COMPENSATING AGC

FIELD OF THE INVENTION

This invention relates to hand-held optical character readers and more particularly to a circuit for compensating for horizontal tilt of the reader during reading cycles.

BACKGROUND OF THE INVENTION

Whenever an optical character hand-held reader is held at an angle to the surface from which data is to be read, some tilt of the video field is produced. This tilt is caused mainly by uneven illumination resulting from unequal distances from the nose tip of the reader to the reading surface. The magnitude and direction of the tilt of the video is a function of the angular position of the hand-held unit. However, some readers have an inherent tilt bias due to gradient sensitivity characteristics is some arrays, small optical alignment errors or illuminator deficiencies.

These built in biases sometimes cause very marginal operation at the tilt angle limits that the reader is required to operate. Tilt in a vertical direction (top to bottom) is generally not a problem because of the ability of the AGC within the reader to change after each row has been scanned and thus track row to row changes. However, there is presently no compensation available in hand-held readers using an array for horizontal tilt. This causes the portion of the frame with lower video levels to threshold on minor noise signals, resulting in vertical black lines within a frame of video. The black lines often cause characters to be rejected.

The part of the problem which results from gradient sensitivity of the photodiode array has been kept within acceptable limits by maintaining a very tight limit in the manufacturing specification of the array and the testing and selecting of the arrays for use in hand-held readers. This has effectively resulted in an increase in cost of the sensor arrays because of the lowering of the yield.

The present invention provides a dynamic compensation for the horizontal tilt condition and insures a reasonable operational margin for the latitude tilt position and ultimately enables the specified tilt limits to be increased in the production specification of photodiode arrays.

SUMMARY OF THE INVENTION

To compensate for the horizontal tilt when using a hand-held optical character reader, a feedback loop is placed between the output of the video analog-digital converter and a scale factor control input to the analog-digital converter. A digital logic circuit senses a horizontal tilt condition in the video and generates a correction ramp of the correct slope and direction to cancel out the tilt. The tilt circuit measures the tilt even when characters are wholly or partially within the field of view of the sensor array and corrects for the tilt without interferring with the reading of characters. The digital video levels for selected columns of the photodiode array are analyzed over a complete frame. At the end of the frame, the error output lines from a logic control circuit are sampled by means of a gateable circuit. If the tilt error is within acceptable limits, the correction circuit is not gated on. When a positive error occurs, a voltage is raised to a higher level to adjust the A/D scale factor. Similarly, if a negative error occurs, the voltage is reduced to adjust the A/D scale factor applied to the A/D converter.

A better understanding of the inventions and the technical advances represented thereby will be better understood after reading the following description of a preferred embodiment and the claims in conjunction with the drawings in which:

Figure 1:
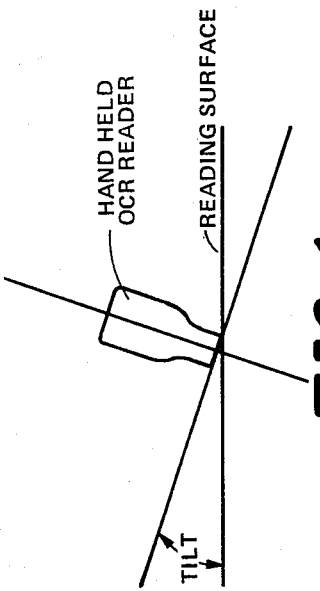
FIG. 1 is a pictorial drawing of an end view of a hand-held wand showing a positive latitude or tilt to the right.

A pictorial representation of the hand reader is shown in FIG. 1 illustrating a horizontal tilt wherein when scanning a line of information the reader is tilted to the right (positive tilt). It is desirable that the reader be held vertically when scanning across a document and that there be no tilt. However, since some tilt may result, it is the purpose of the present invention to correct for this tilt if the tilt is greater than a predetermined acceptable amount.

Figure 2:
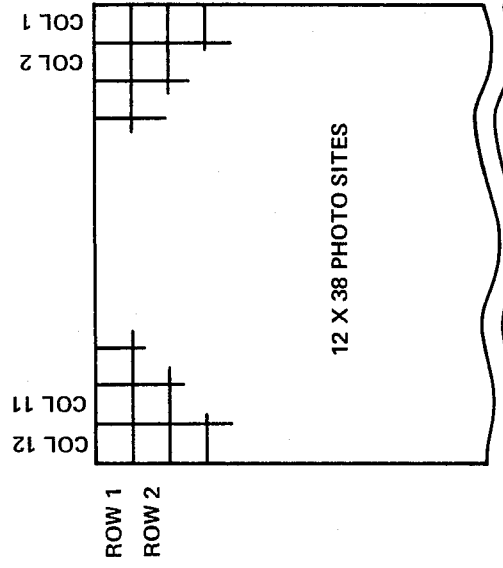
FIG. 2 illustrates the format of the array of the data matrix.

FIG. 2 illustrates the format of the array of the data matrix. As will be noted, the array is 12 columns by 40 rows. The first 38 rows are used for data and the last two rows, rows 39 and 40, are referred to as the first black reference row and the second black reference row. These rows are used for calibration purposes and for synchronization.

The array in FIG. 2 is an array of self scanning photodiodes. The array scans from right to left, from top to bottom as viewed in the object plane. Ideally each photoelement in the array should have the same photosensitivity, but because of variance in the manufacturing the elements will not be completely uniform.

The tilt compensation circuit utilizes the 1st and 2nd columns and the 11th and 12th columns to determine if there is sufficient tilt that correction needs to be made. This is accomplished by examining the value of the video signal from each photo element in columns 1, 2, 11 and 12 over one frame, a frame being one complete scan of the array. The evaluation takes place after the video has been digitized in an analog-to-digital converter.

Figure 3:
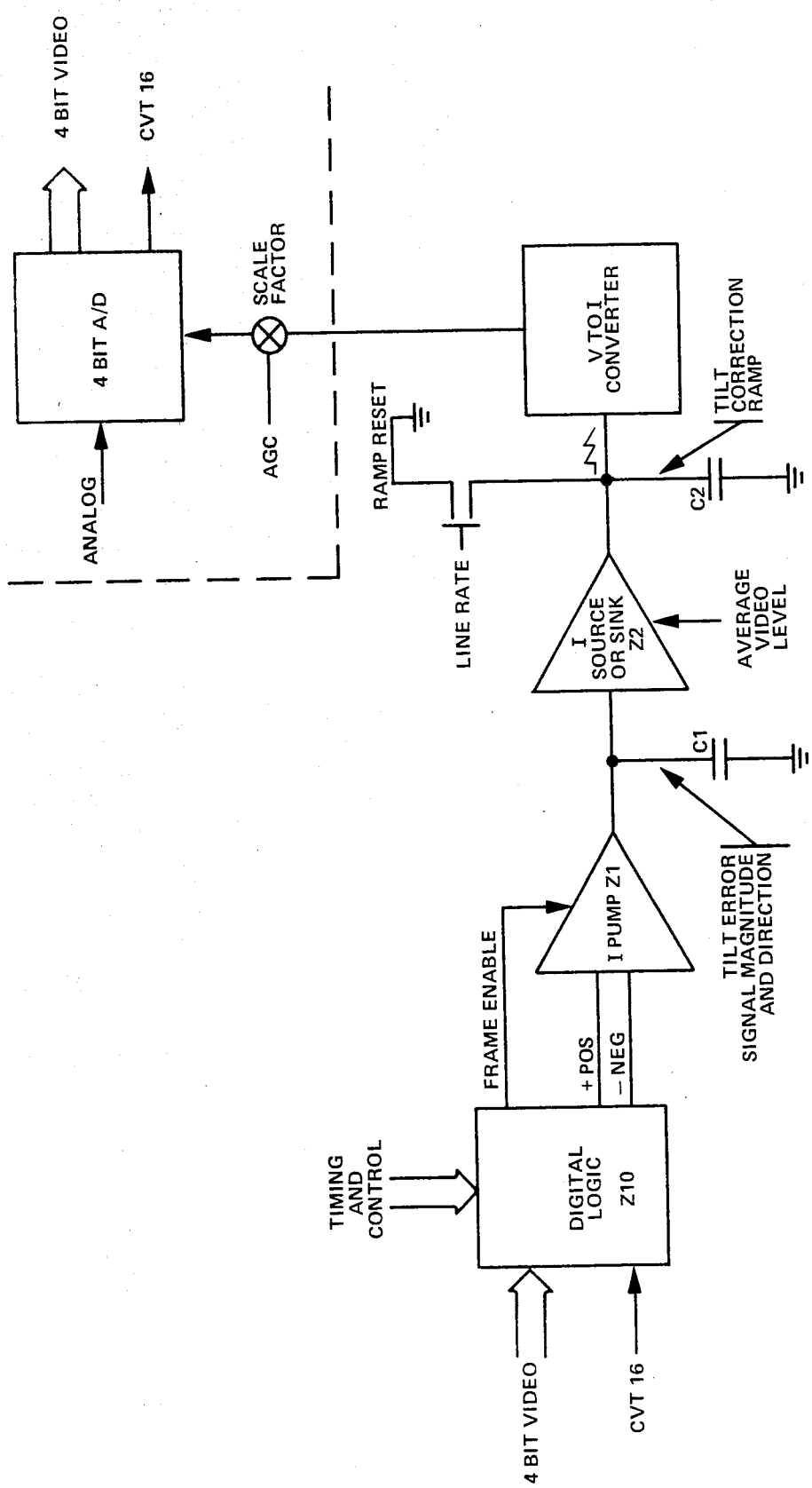
FIG. 3 is a functional block diagram of the tilt correction circuit.

A block diagram showing the functional elements of the system is illustrated in FIG. 3. Basically, it consists of a feedback loop between the 4 bit output of the video analog to digital converter and a scale factor control input to the A/D converter. The circuit senses a horizontal tilt condition in the video and generates a correction ramp with the correct slope and direction to cancel out the tilt. A major requirement of the tilt detection circuit is to adequately measure the tilt when characters are wholly or partially within the field of the sensor array. The generation of a positive or negative error signal is accomplished by digital means. The digital video level for columns 1, 2, 11 and 12 are analyzed over a complete scan frame in the digital logic circuit Z10. The logic circuit Z10 receives the 4 bit video data, another digital signal CVT16 generated in the 4 bit A/D converter, discussed below, and timing and control signals. At the end of the frame, the error output lines from the logic control circuit are sampled by means of gateable charge pump Z1. However, if the tilt error is within acceptable limits defined below, the charge pump is not gated on. When a positive error occurs, the charge pump will inject current into the capacitor C1 raising its voltage. As long as a positive error exists each frame, the voltage across C1 will continue to increase. In like manner, a negative error signal will generate a negative voltage at C1. This voltage represents the magnitude and direction of the horizontal tilt correction required.

The voltage on capacitor C1 controls a linear source/sink current generator Z2 that drives capacitor C2. The voltage on capacitor C2 is reset to zero each line time. Thus the voltage at C2 is a ramp signal at the line rate whose amplitude and slope direction are controlled by the voltage on capacitor C1. The second input to Z2 is a DC level proportional to the video level that sets the current range of Z2. This serves to keep the tilt loop gain constant over the AGC range of the A/D converter, resulting in consistent attack times and the same degree of tilt compensation.

The correction ramp voltage is converted to a ramp control current for interfacing to the 4 bit A/D converter. The A/D converter is designed to have a variable scale factor of conversion, proportional to the current through this input. The normal AGC range is obtained by controlling the 'DC' value of this current. The tilt compensator injects a ramp modulation onto this current causing the A/D converter scale factor (gain) to vary linearly across the array. Thus, analog cell signals into the A/D converter that form a horizontal tilting envelope, will be converted to the same 4 bit digital value removing the tilt.

Figure 4:
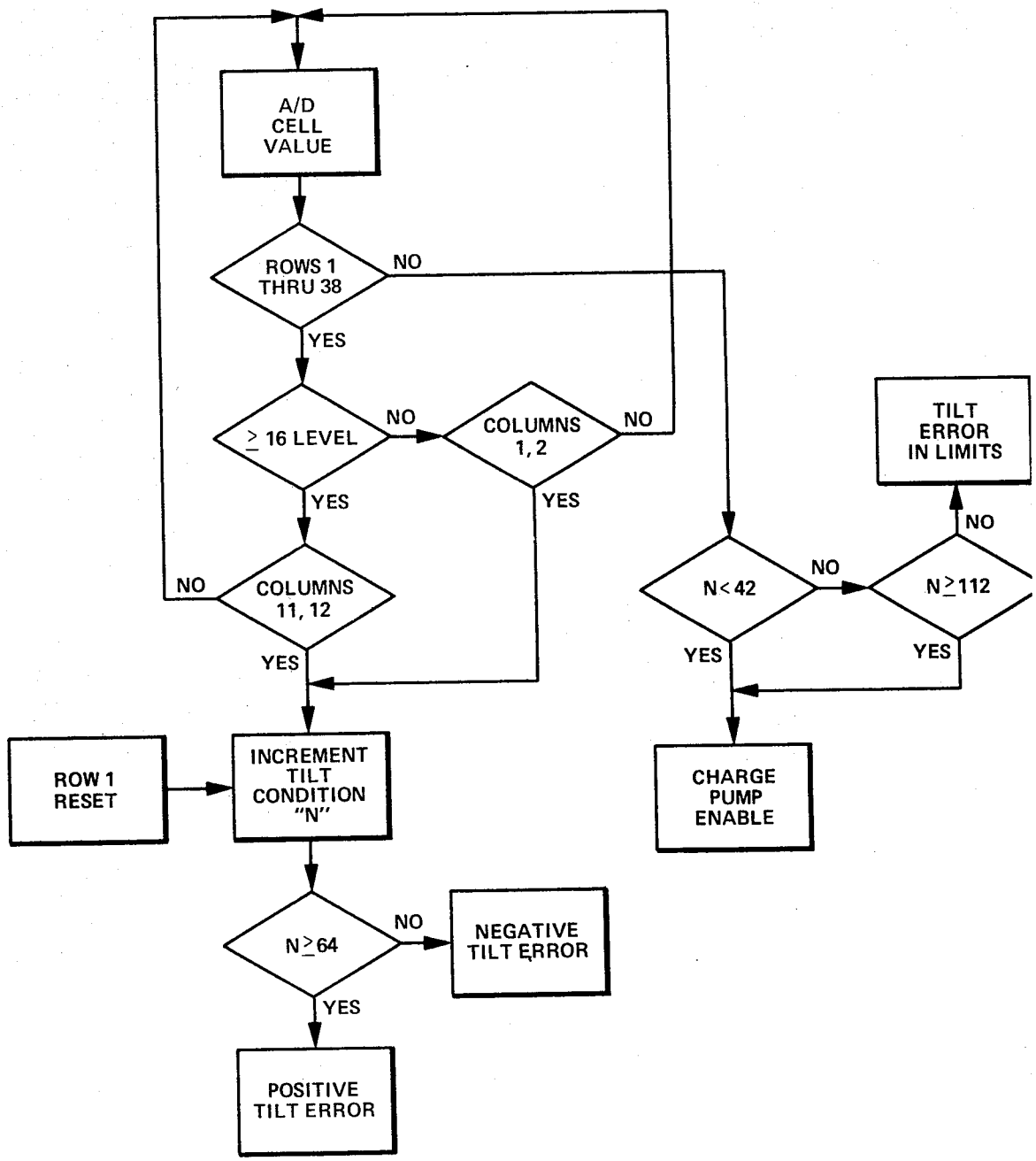
FIG. 4 is a logic flow diagram of the operation of the tilt error detection circuit.
Figure 5:
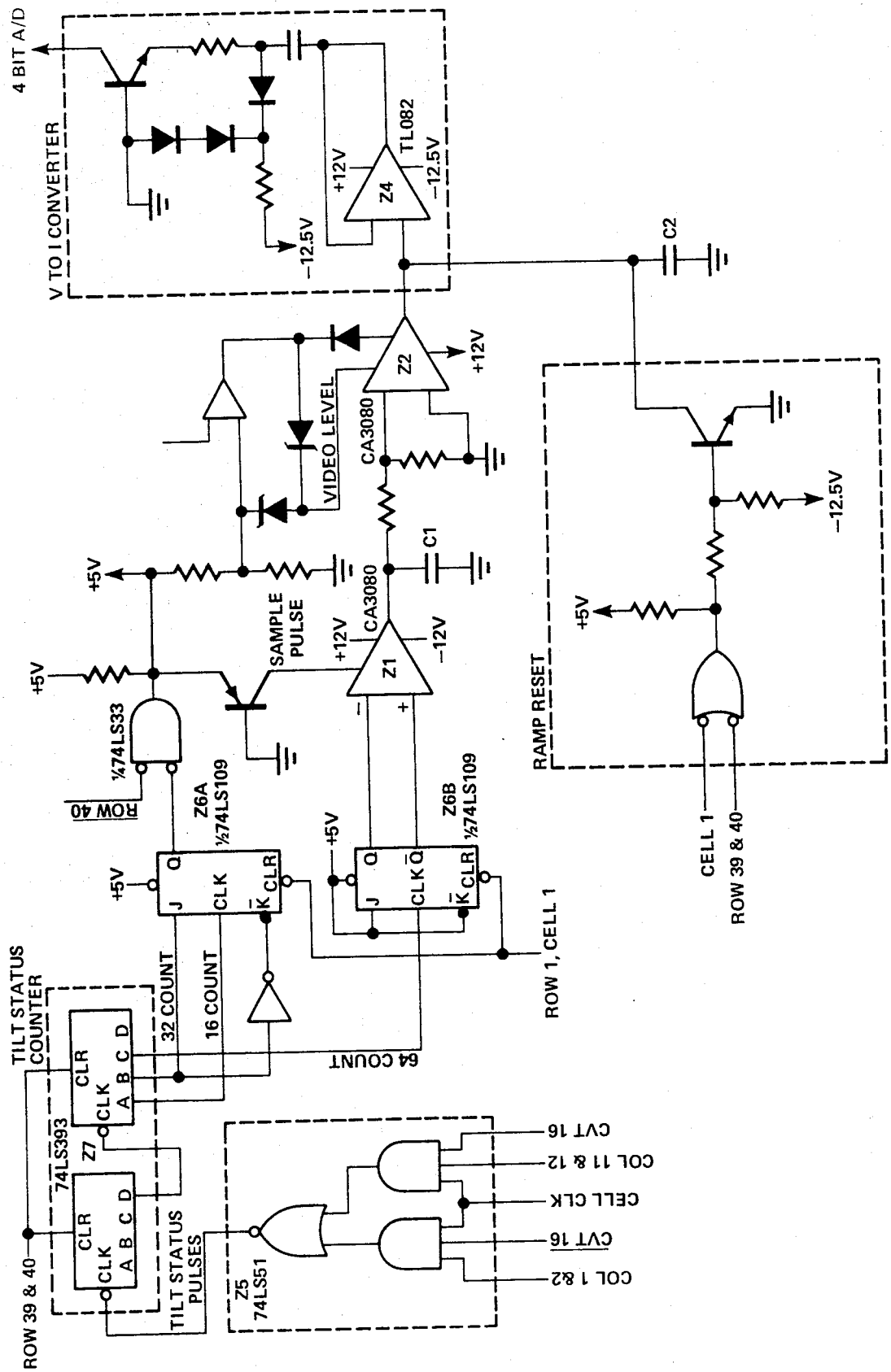
FIG. 5 is a more detailed diagram of the tilt correction circuit.

The function implemented in FIG. 3 is illustrated in the flow chart of FIG. 4. The signal level of each cell is converted to a 4 bit digital signal with black represented by zero. Thus, 'level 16' corresponds to the whitest value or a background level. The columns are numbered in the sequence of being scanned with a total of 12 data columns being outputted by the array sensor. The direction of scan referenced to the plane of the paper is from right to left. Cells that have intensity levels of 16 in Columns 11 and 12 cause a counter to be advanced. Cells in columns 1 and 2 that are less than a 16 level also are counted. The logic elements that implement this function are 25 and 27 illustrated in the more detailed circuit in FIG. 5. The number of counts accumulated during a frame period indicates the amount and direction of tilt. This is shown graphically in FIG. 7. A zero count would be an extreme positive latitude tilt angle and the maximum count of 152 would correspond to large negative latitude tilt. A satisfied region between 48 and 112 counts was selected to allow for some nonuniformity of response in the array sensor and to minimize the effect of character images on the tilt error signal. The decoding of the tilt count is accomplished by Z6a and Z6b (FIG. 5). An error inhibit signal is generated that prevents the charge pump Z1 from being activated for counts between 48 and 112. A second signal with complimentary outputs to drive Z1 is produced that indicates the error direction.

Figure 7:
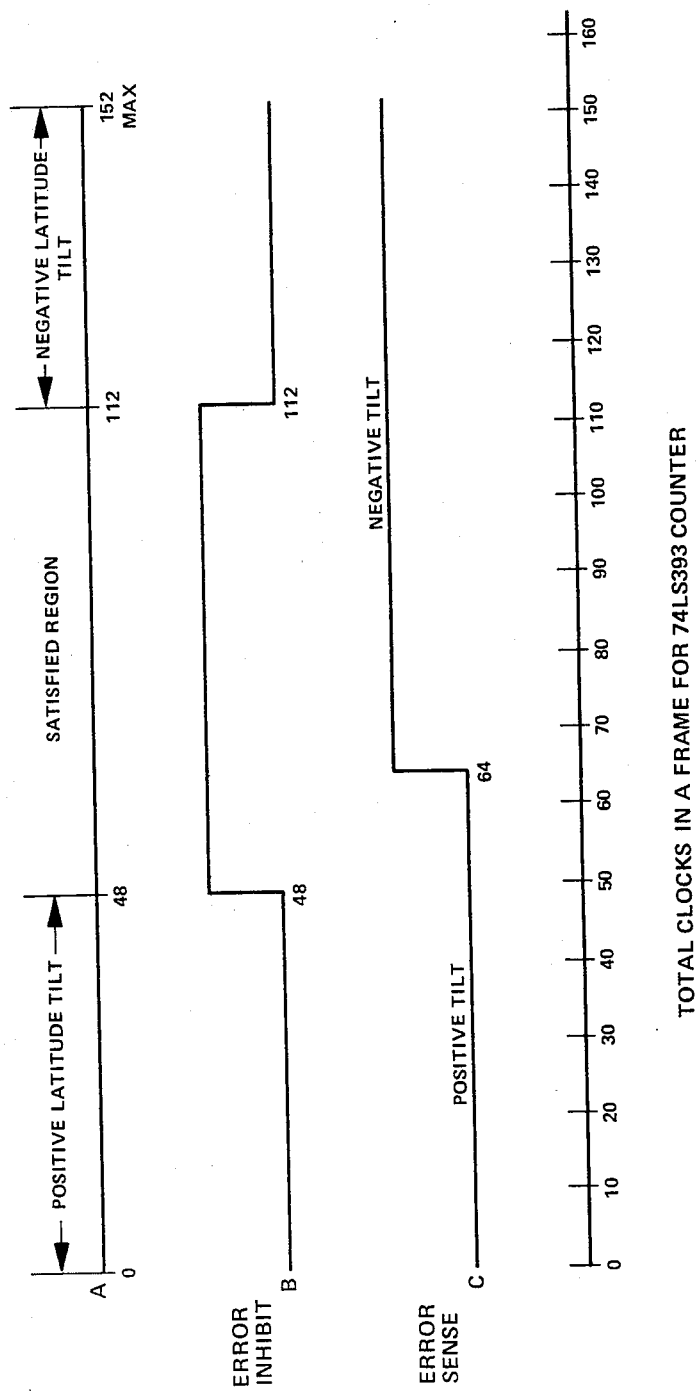
FIG. 7 illustrates the tilt count definition over a frame of video.

The analog voltage generated on each photoelement in the scanning array is gated to the A/D converter. The converter changes each voltage to a pulse width modulated signal, the width of the signal depending upon the amplitude of the voltage on the photoelement. Each pulse width signal is then converted to a 4 bit digital signal representative of the analog voltage amplitude. In the 4 bit analog to digital converter normally the highest or widest count out would be the digital value 1111 or 15. However, to provide the CVT 16 value, there is another counter stage within the A/D converter in which the whitest level permits a 16th count based upon the greatest reflectance picked up by the scanning array. The output of the input logic circuit Z5 is then fed into the counter Z7, the output of which is a 16, 32 or 64 count. It is the resulting count which defines the tilt error count as illustrated in FIG. 7. If the count is zero to forty-eight, there is a positive latitude tilt; from 48 to 112 is considered a satisfactory region and from a 112 to 152 is a negative latitude. There is an error inhibit if the count falls between 48 and 112. The dividing line between positive and negative is 64 counts as illustrated in 7 C. Each of the graphs in FIG. 7 is plotted against the total clock count in each frame which is 152 counts maximum. The output of the counter 27 feeds into the logic elements Z6a and Z6b. Counter Z6b also has reference inputs Row 1 and Cell 1 to reference beginning of a scan. Since the system works on each frame, the two counters in Z7 are reset with the scanning of row 39 and row 40, the black reference rows. The output of Z6b goes to the current source Z1 which is used to charge capacitor C1 as explained above. The voltage on capacitor C1 feeds the source or sink Z2 which charges capacitor C2 in a positive or negative direction depending upon the direction of tilt. The ramp voltage on C2 is reset each frame by the ramp reset circuit which clamps the voltage on C2 to ground or to a reference level just prior to the beginning of a frame. The voltage to current converter then changes the ramp voltage to a current which is used to alter the conversion scale factor within the A/D converter thereby compensating the scanned video by a tilt factor as required.

Figure 6:
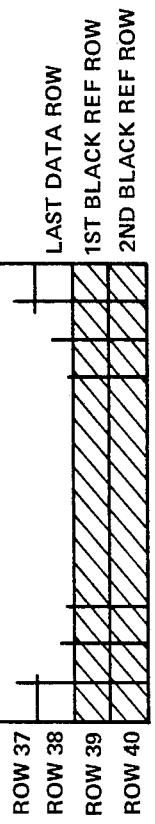
FIG. 6 is a chart showing the tilt status counter and the ranges of counts of the counters.
Figure 6:
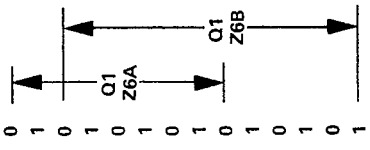

FIG. 6 is a chart illustrating the status of the tilt counter Z7 and illustrates the outputs which are fed to the count decoder Z6a and Z6b. As illustrated in the left column, the maximum count is 152. This is represented by 4 columns by 38 cells per column. The 4 columns are Columns 1 and 2 and 11 and 12 of the array. As shown, the decoder Z6a is operative between counts 48 and 112 and decoder Z6b between 64 and 152.

All of the components used within the system illustrated within FIG. 6 are commercially available devices and examples are given in the drawings of such devices which may be used. The arrangement in FIG. 6 is one illustration of how the tilt compensation may be accomplished. However, the specific circuit given herein is for purposes of illustration only and sets forth one example of a circuit which performs the function of the invention. Other arrangements are possible which achieve the same result and will be clear to those skilled in the art having read the above description of the invention in conjunction with the following claims.

What is claimed is:

1. An apparatus for compensating for tilt of a handheld optical character reader while scanning a document by adjusting the scale factor input to an analog to digital converter comprising, a scanning array having a plurality of rows and a plurality of columns of photoelements; means for generating a plurality of white reference signals in the converter, means for counting the occurrence of the white reference signals from the outputs of photoelements in at least two of said plurality of columns, and means for modulating the converter scale factor input based upon the occurrence of the white reference signals.

2. The apparatus according to claim 1 wherein the selected columns are the first two and last two columns in the array.

3. An apparatus for compensating for horizontal tilt of a hand-held optical character reader while scanning a document including; a self-scanning array of photodiode elements arranged in a plurality of rows and columns, the output of which is a serial video signal including the output of each individual photosensitive element, an analog-to-digital converter for changing the video signal from each photoelement to a binary signal when compared to a reference signal input into the converter, a feed back loop including means to generate a scale factor signal between the output of the converter and a scale factor signal input to the converter, and a tilt compensation circuit including a logic circuit to count the occurrence of predetermined binary signals at the output of the analog-to-digital converter in the feed back loop which adjusts the scale factor signal value to compensate for tilt in the hand-held reader.

4. The apparatus according to claim 3 including means for generating a tilt correction ramp function indicative of the magnitude and direction of tilt based upon the count output of the logic circuit, and means for applying the ramp function to the analog-to-digital circuit to compensate for tilt of the hand-held reader.

5. The apparatus to claim 4 wherein a count between 0 and 48 is indicative of a tilt to the right, a count between 112 and 152 is indicative of a tilt to the left, and a count between 48 and 112 is indicative that no tilt correction is required.

6. The apparatus to claim 3 wherein one scan of each of the photoelements in the array represents a frame of data and that tilt compensation is applied to each frame.

* * * * *